(12) United States Patent
Usami

(10) Patent No.: US 8,174,368 B2
(45) Date of Patent: *May 8, 2012

(54) READING METHOD, RESPONDER, AND INTERROGATOR

(75) Inventor: Mitsuo Usami, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 143 days.

This patent is subject to a terminal disclaimer.

(21) Appl. No.: 12/370,263

(22) Filed: Feb. 12, 2009

(65) Prior Publication Data

US 2009/0146794 A1 Jun. 11, 2009

Related U.S. Application Data

(63) Continuation of application No. 10/562,464, filed as application No. PCT/JP03/10211 on Aug. 11, 2003, now Pat. No. 7,508,296.

(51) Int. Cl.
 H04Q 5/22 (2006.01)
 G08B 13/14 (2006.01)
 G08B 1/08 (2006.01)
 G06F 13/28 (2006.01)

(52) U.S. Cl. .............. 340/10.4; 340/572.1; 340/539.11; 710/22

(58) Field of Classification Search .................. None
See application file for complete search history.

(56) References Cited

U.S. PATENT DOCUMENTS

| | | | |
|---|---|---|---|
| 5,247,305 A | 9/1993 | Hirata et al. | |
| 5,410,263 A * | 4/1995 | Waizman | 327/141 |
| 5,469,152 A * | 11/1995 | Yamamoto et al. | 340/825.63 |
| 5,673,018 A * | 9/1997 | Lowe et al. | 340/445 |
| 5,890,105 A * | 3/1999 | Ishihara et al. | 704/201 |
| 5,959,568 A * | 9/1999 | Woolley | 342/42 |
| 6,010,075 A | 1/2000 | Ishifuji et al. | |
| 6,154,715 A * | 11/2000 | Dinteman et al. | 702/120 |
| 6,593,845 B1* | 7/2003 | Friedman et al. | 340/10.33 |
| 6,674,359 B1 | 1/2004 | Aslanidis et al. | |
| 7,408,456 B2* | 8/2008 | Whitesmith et al. | 340/500 |
| 2004/0148482 A1* | 7/2004 | Grundy et al. | 711/167 |
| 2004/0212478 A1* | 10/2004 | Kutsuzawa et al. | 340/5.6 |
| 2005/0114560 A1* | 5/2005 | Coleman et al. | 710/22 |

FOREIGN PATENT DOCUMENTS

| | | |
|---|---|---|
| EP | 919 943 | 6/1999 |
| EP | 1 148 440 A1 | 10/2001 |
| JP | 1-182782 A | 7/1989 |
| JP | 10-224278 | 8/1998 |
| JP | 10-224278 A | 8/1998 |
| JP | 00/36555 | 12/1999 |
| JP | 2001-168759 | 6/2001 |
| JP | 2003-084971 | 3/2003 |

(Continued)

*Primary Examiner* — Daniel Wu
*Assistant Examiner* — Fekadeselassie Girma
(74) *Attorney, Agent, or Firm* — Mattingly & Malur, P.C.

(57) ABSTRACT

Transmission and reception of the identification number to/from an interrogator includes an interrogator that reads a recognition number from a responder by radio. When a clock pulse is modulated on a high-frequency carrier and transmitted to the responder from the antenna of the interrogator, there are a first case when the clock pulse interval is short and a second case when the clock pulse interval is long. By combining the clock pulse of the first case and the clock pulse of the second case so as to control the read of the recognition number from the interrogator, it is possible to realize reduction of the semiconductor chip size of the responder and suppress the cost of the semiconductor chip.

16 Claims, 16 Drawing Sheets

FOREIGN PATENT DOCUMENTS

| | | |
|---|---|---|
| JP | 2003/084971 | 3/2003 |
| JP | 2003-168091 | 6/2003 |
| WO | 98/21691 | 5/1998 |
| WO | 04/059867 A1 | 12/2003 |

* cited by examiner

TIME ELAPSE

READING METHOD, RESPONDER, AND INTERROGATOR

This is a continuation application of U.S. application Ser. No. 10/562,464, filed Dec. 27, 2005 now U.S. Pat. No. 7,508,296, which claims priority to PCT/JP03/010211, filed Aug. 11, 2003, the contents of which are hereby incorporated into this application.

TECHNICAL FIELD

The present invention relates to an identification method and device for identifying responders by transmitting and receiving a signal between an interrogator and a plurality of responders and in particular, to a method and a device for performing identification by controlling congestion of a response signal from the interrogator and the responders.

BACKGROUND ART

The present description references the following documents. The documents are to be referenced by their document numbers.
[Document 1] WO 98/21691
[Document 2] WO 00/36555

When a plurality of responders exist in an effective radio wave area of the interrogator, it is necessary to identify response signals from the responders. Document 1 discloses a technique for preventing cross talk between the responders.

The technique disclosed in Document 1 is as follows. An interrogation signal from the interrogator is received and the responder transmits a predetermined number of bits. The interrogator receives the predetermined number of bits transmitted from the responder and returns them to the responder. When the number of bits returned is identical to the number of bits transmitted, the responder transmits a predetermined number of bits subsequent to the bits already transmitted and repeats the same process. When the number of bits returned is not identical to the number of bits transmitted, the responder does not participate in the identification process until the next interrogation signal is received. By repeating this process, finally, only one responder makes identify its identification number. By repeating this recognition process until no unprocessed responder exists, identification of the responders is complete.

In Document 1, transmission and reception to/from the interrogator are repeated in bit unit of a predetermined number and accordingly, this technique requires a logical circuit for switching between transmission and reception and control of a memory address counter requiring various commands (interrogation signal, reception bit return signal, identification failure report signal, identification completion report signal), a plenty of operation stages accompanying the commands, a flip-flop representing the state transition, and a data comparison circuit.

Document 2 discloses a technique in which a responder having a memory for storing an identification number in accordance with the clock pulse from the interrogator transmits the identification number. In Document 2, the responder as RFID transmits an identification number in accordance with the clock pulse from the interrogator, thereby excluding a command in communication and simplifying the transmission/reception method.

DISCLOSURE OF THE INVENTION

The representative invention among the inventions disclosed in this application can be outlined as follows.

There are provided an interrogator reading a recognition number in a responder by radio and the responder. When a clock pulse is modulated to a high-frequency carrier and transmitted to the responder from the antenna of the interrogator, there are a first case when the clock pulse interval is short and a second case when the clock pulse interval is long. By combining the clock pulse of the first case and the clock pulse of the second case, the responder controls reading of the identification number from the interrogator.

BEST MODE FOR CARRYING OUT THE INVENTION

A large amount of RFID tags are distributed and they become disposable since their collection cost is large. Accordingly, there is a problem to reduce the manufacturing cost of the RFID tag.

In order to arrange a plurality of RFID in the effective radio wave area from the interrogator and increase the effective radio area greater than the size of the RFID mounting object and the range of the arrangement interval, the RFID should have the congestion control function.

In the present invention, by simplifying the transmission/reception method in the responder and the interrogator and simplifying the congestion control function, the function of the RFID is minimized so that the number of chips (RFID tags) which can be cut out from one wafer is increased to so as to improve the mass production. Thus, the RFID can have the congestion control function and the manufacturing cost per piece can be reduced.

For example, the RFID attached to a product such as clothes requires a large collection cost and it is commercially preferable that the RFID be disposable. Furthermore, the congestion control is indispensable for managing products in a box for transporting, without opening the box. Accordingly, it is necessary to reduce the RFID tag cost so as to enable disposing of the RFID tag and enable congestion control.

Figure 8:
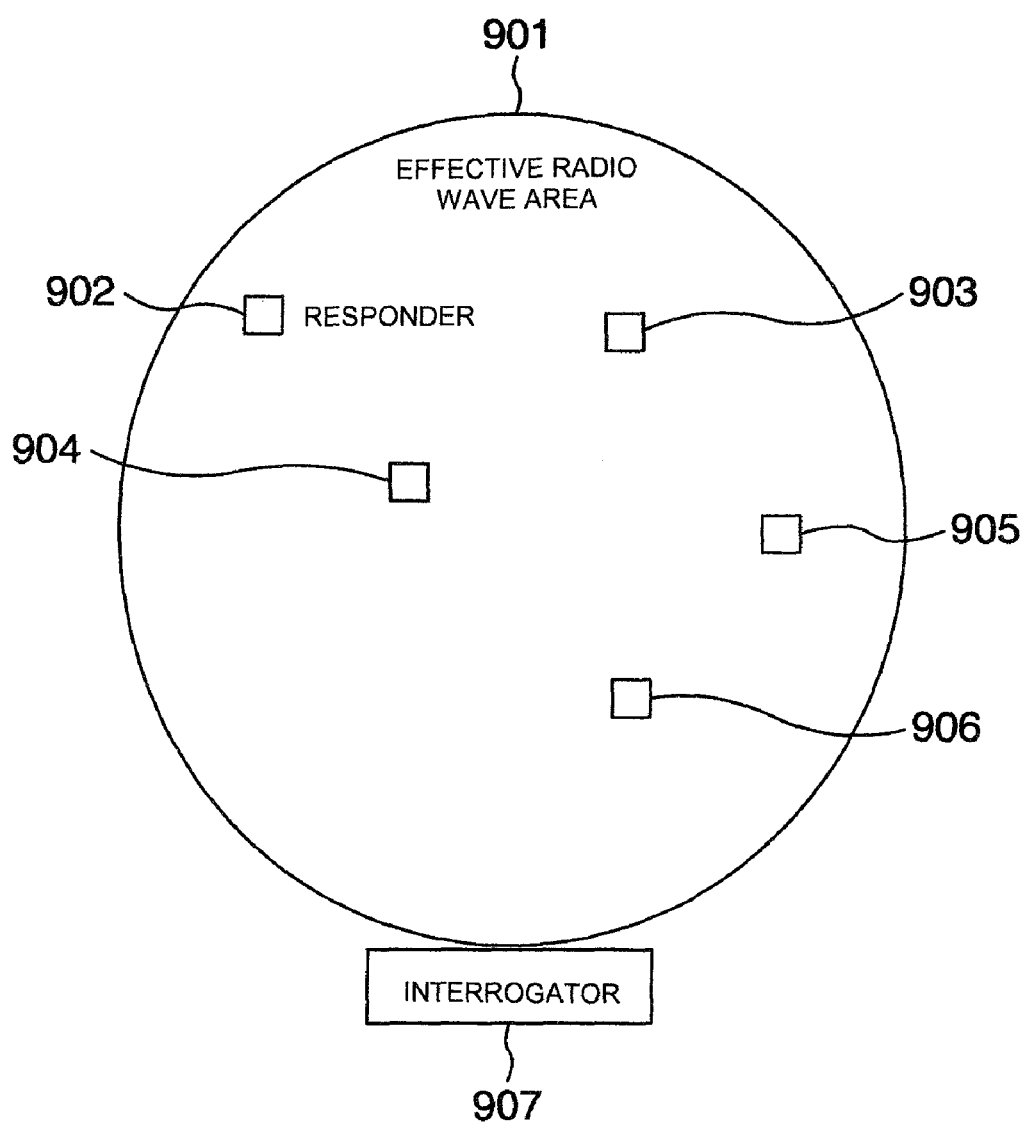
FIG. 8 is a diagram showing a case requiring congestion control.

FIG. 8 shows an example that a plurality of responders 902 to 906 according to the present invention exist in the effective radio wave area 901 of the interrogator 907. FIG. 8 shows an example of five responders 902 to 906. Details will be give later. Even when a plurality of responders exist in the effective radio wave area 901, it is possible to read out the memory of each responder by operating each responder by the two types of clock pulses (modulation signals), i.e., long and short clock pulses from the interrogator.

Figure 10:
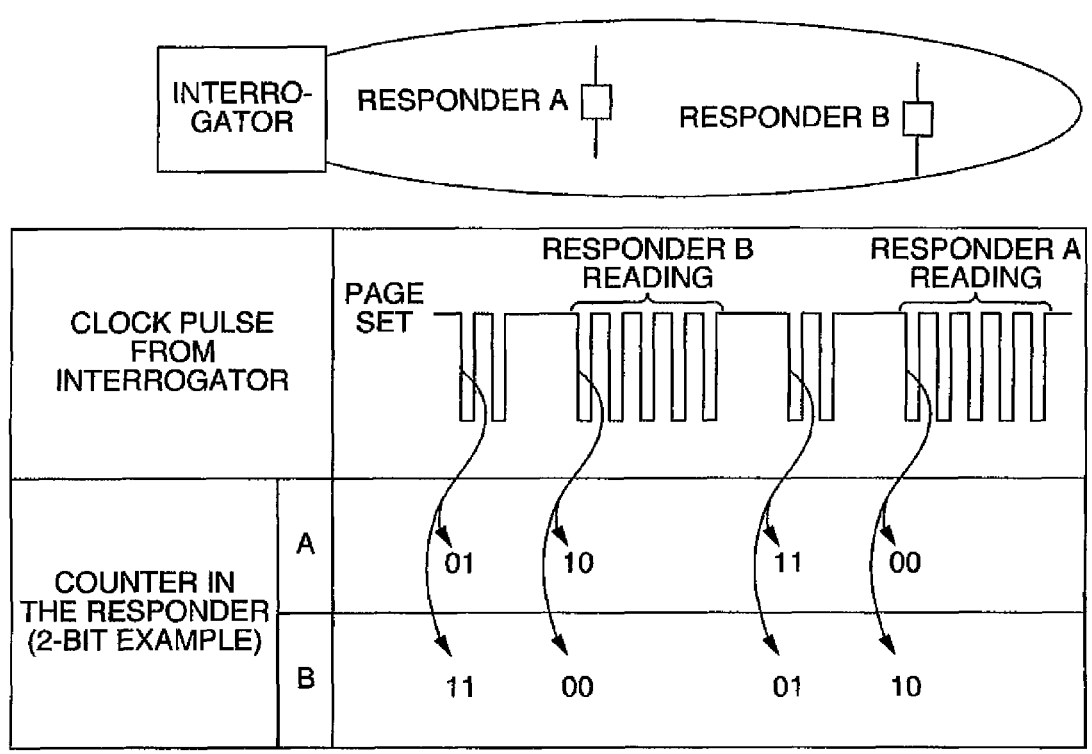
FIG. 10 is a diagram showing a protocol according to the embodiment.

FIG. 10 shows a specific responder, a communication method in the interrogator, and a congestion control method. FIG. 10 shows a case when chip A and chip B exist in the effective radio area. Moreover, in this embodiment, each chip has 2-bit counter for simplification. When the clock pulse from the interrogator starts, chip A and chip B simultaneously set the initial values of the page numbers predetermined for the counters. In this embodiment, the page number is 01 in chip A and 11 in chip B. The interrogator outputs a short-interval clock pulse to read out the memory of the responder. However, the counter in each chip is not yet 00 and each chip does not transmit the memory content. Since no data is coming, the interrogator judges that the no responder is operating and stops transmission of the short-interval clock pulse and transmits a long-interval clock pulse. Then, each pulse increments the page number by +1. That is, the page number becomes 10 in chip A and 00 in chip B. Here, chip B sets an operation switching flip-flop and transmits memory data to the interrogator with the next short-interval clock pulse coming. When it terminates normally, the interrogator again transmits a long-interval clock pulse and the counter of chip A also becomes 00 and chip A transmits data. Like this example, chip A and chip B can transmit memory data without being overlapped and the interrogator rapidly turns the page by the long-interval clock pulse, thereby reducing the read out time of the congestion control.

Figure 9:
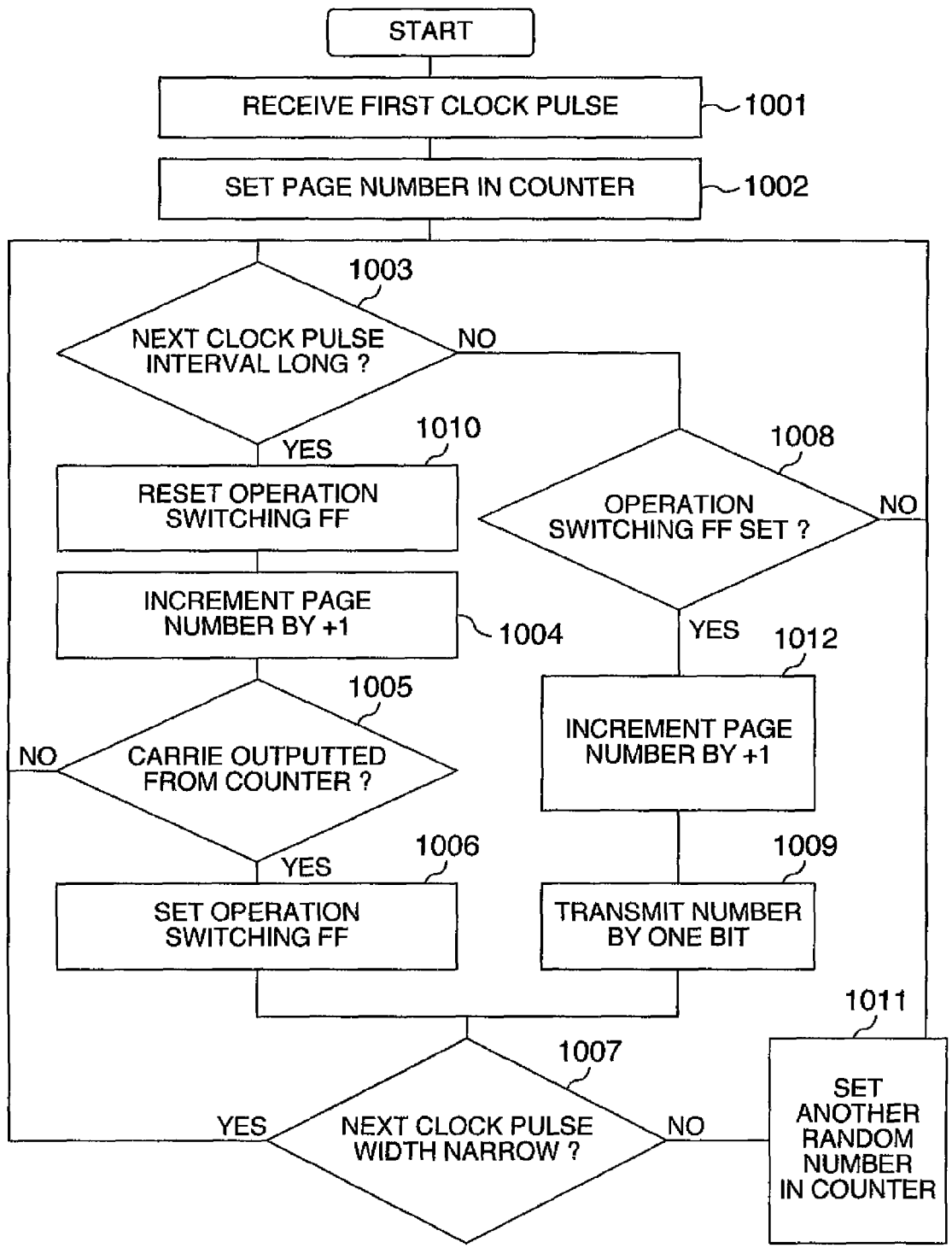
FIG. 9 is a diagram showing an operation flow of the responder according to the embodiment of the present invention.

FIG. 9 is a flowchart of the communication method with the interrogator and the congestion control method in the responder of the present invention. The responders 902-906 demodulates a modulated signal from the interrogator 907 and acquires the two types of clock pulse having a long or a short interval.

As a basic operation of the responder, the page number is counted up by the clock pulse having a long clock interval and the memory address is counted up by a clock pulse having a short clock interval (hereinafter, the clock pulse having the long clock interval will be referred to as a long clock pulse and the clock pulse having the short clock interval will be referred to as a short clock pulse). By employing tow types of clock pulse having different clock intervals, it is possible to simplify the communication method, the congestion control method, and configuration of the responder and the interrogator.

Moreover, in the embodiment of the present invention, the clock interval represents a time interval between an L level and the next L level, i.e., the time interval from the fall from the H level to the L level to the next fall.

The clock width is defined by time length in the L level state, i.e., the time interval from the fall from the H level to the L level to the rise from the L level to the H level. In the flowchart of FIG. 9, the clock interval and the clock width are used separately for control.

When the operation switching flip-flop is in the reset state, the page number is counted up and when the operation switching flip-flop is in the set state, the memory address is counted up.

In step 1001, the responder receives the first clock pulse from the interrogator. The first clock pulse may be long or short.

In step 1002, the page number (random number) held uniquely in each responder is set as the initial value in the counter. The page number is a number defining the order of transmission of the identification number when a plurality of responders exist in the effective radio area of the interrogator.

In step 1003, the L level width of the next clock pulse is monitored. The responder receives the next clock pulse and checks whether the interval is long or short. When the clock pulse interval is long (in the case of the long clock pulse), control is passed to step 1010 and when the clock pulse interval is short (in the case of the short clock pulse), control is passed to step 1008.

In step 1010, the operation switching flip-flop in the responder is reset, i.e., the page number count up is enabled, and control is passed to step 1004, where the page number set in the counter is incremented by +1.

In step 1005, when a carry is outputted from the counter, it is indicated that the counter content has become zero. That is, in the binary counter, count up is performed by one bit and after all one, the operation is performed to all zero. When the all zero is set, a carry is outputted. It is checked whether a carry is outputted from the counter. When a carry is outputted in step 1006, the operation switching flip-flop is set by using the carry of step 1005 in the responder. That is, count up of the memory address is enabled. When no carry is outputted, control is returned to step 1003 to wait for the next clock pulse.

Step 1007 waits for the next clock pulse and monitors the width of the L level of the clock pulse. When the clock pulse width is narrow, control is returned to step 1003. When the clock pulse width is wide, control is passed to step 1011, where a page number other than that of step 1002 is set in the counter, and control is returned to step 1003.

On the other hand, when control is passed from step 1003 to step 1008, step 1008 checks whether operation switching flip-flop in the responder is set. When it is set, the memory address is incremented by +1 in step 1012 in FIG. 9 and control is passed to step 1009, where the number of the responder is outputted by one bit. After this, control is passed to step 1007.

Here, it should be noted that the flow is one of the embodiments and the branching condition of step 1003 in FIG. 9 may be vice versa and the branching condition of step 1007 in FIG. 9 may be vice versa.

When the responder receives a clock pulse of short interval, the responder checks whether the operation switching flip-flop in its chip is set. When the operation switching flip-flop is set, memory data is outputted. Otherwise, the clock pulse of the short interval is ignored.

Since the responder has the operation switching flip-flop, when the flip-flop is set, the responder transmits a number in accordance with the clock pulse of the interrogator and when the operation switching flip-flop is not set, the number transmission is not performed, thereby preventing the simultaneous operation of the responders to cause congestion of the number transmissions.

When a plenty of radio IC tags exist at random in the effective radio wave area, the possibility of conflict of the page numbers becomes high. When a plurality of responders have the same page number, the operation switching flip-flops are set at the same time and the number is simultaneously transmitted to the interrogator. Since the interrogator receives the number from the responders by the logical OR, the error detection code built in the number does not become a normal code and the interrogator receives it as an error number.

For this, the responder has a plurality of page numbers and when the first page number set in the counter is identical to the page number of another responder, it is set to a second page number which is different from the first page number by the flow of step 1011 in FIG. 9, which reduces the possibility of repeated conflict of the page number. It is possible to set the number of bits of the page number, and the number of page numbers in the responder in accordance with the use purpose (the number of responders existing in the effective radio wave area of the interrogator, etc.).

When the modulation method is ASK, the state that no responder exists in the effective radio wave area of the interrogator and the transmission of a bit indicating the L level by the responder are the same state viewed from the interrogator. When the first bit of the memory of the responder storing the identification number (or the first bit when transmitting the identification number to the interrogator) is electrically H level, the interrogator can immediately confirm the existence of the responder which can transmit the identification number, which is preferable for reduction of the time required for reading the identification number. More generally, in the bit transmission order of the identification number, it is preferable to prepare a bit indicating the electrically H level before ½ of the total bit count so that the interrogator can rapidly confirm the existence of the responder which can transmit the identification number.

Here, it is not prevented that a responder looks like existing by the noise and a plurality of responders exist and operate. When this noise is present, it becomes uncertain to which step in the flow of FIG. 9 the responder goes, and the interrogator stops transmission of the modulation signal to the responder and again retries read out.

Moreover, when electrically H level is set and no bit is outputted, the interrogator considers that no reception data is present. That is, when no bit indicating electrically H level is present before ½ of the total bit count, the interrogator considers that no responder exists.

Figure 16:
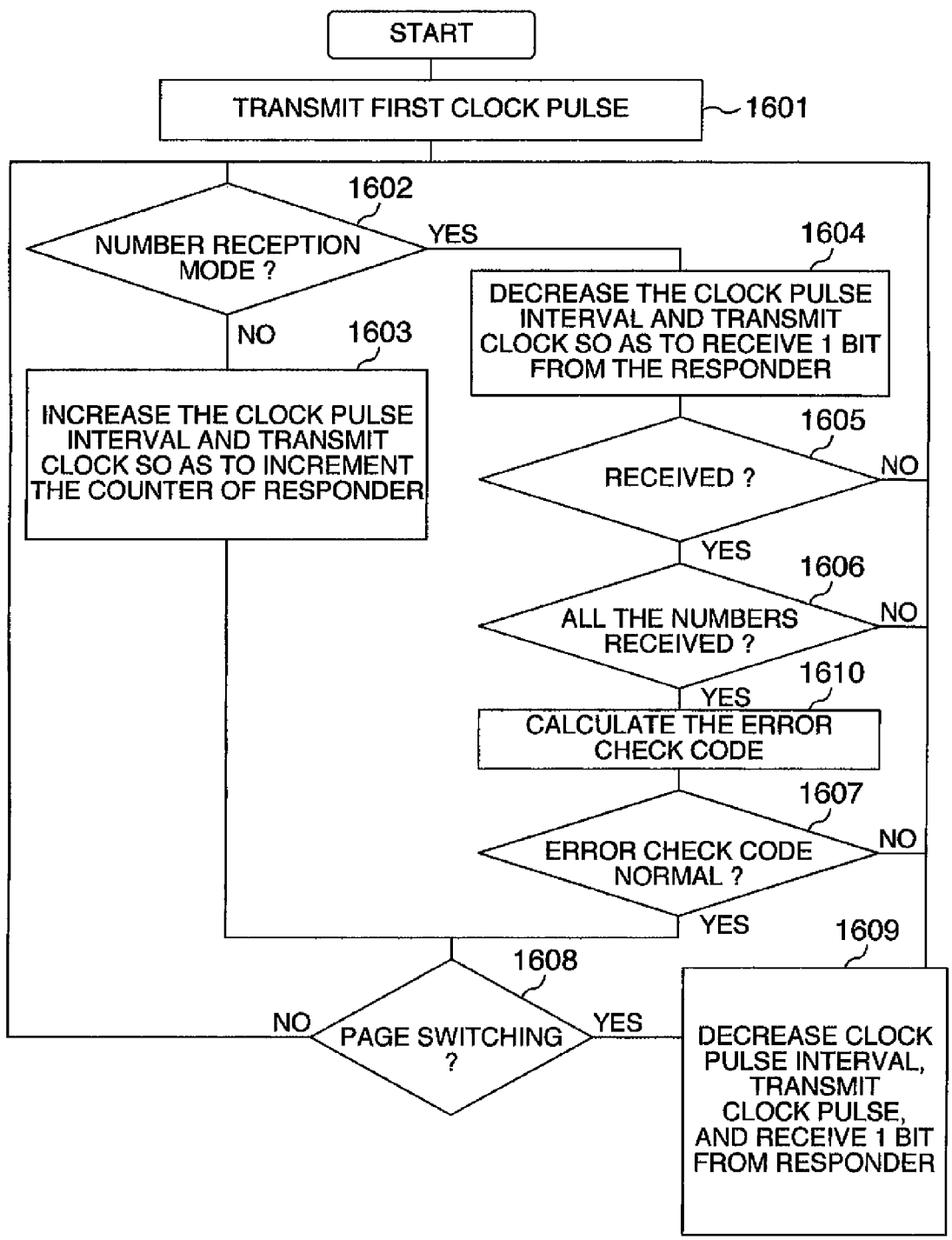
FIG. 16 is a diagram showing an operation flow of the interrogator.

FIG. 16 is a flowchart showing the communication method with the interrogator and the congestion control method in the responder of the present invention.

In step 1601, the interrogator transmits a first clock pulse to the responder.

In step 1602, the interrogator checks whether the number reception mode is set. If the number reception mode is set, control is passed to step 1604. Otherwise, control is passed to step 1603.

In step 1604, the interrogator transmits a short clock pulse to the responder and receives one bit of the identification number from the responder.

Step 1605 checks whether one bit has been received. If received, control is passed to step 1606. Otherwise, control is returned to step 1602.

Step 1606 checks whether all the identification numbers have been received. If no, control is returned to step 1602 of FIG. 16. If yes, control is passed to step 1607, where the error check code is checked whether it is normal.

If not normal in step 1607, control is returned to step 1603 for repeatedly performing read. If normal, control is passed to step 1608.

Step 1608 checks whether the operation is page switching. If yes, control is passed to step 1609, where a long clock pulse is transmitted and another page number is set in the responder counter. If no, control is returned to step 1602.

Figure 6:
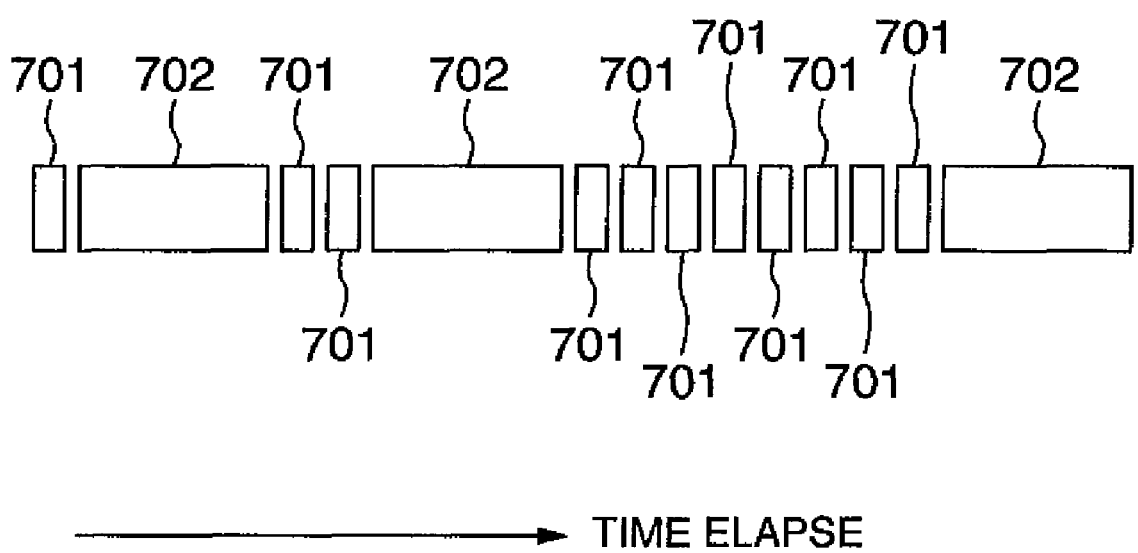
FIG. 6 is a diagram showing reading from the responder according to the embodiment.

FIG. 6 shows a clock pulse transmitted from the interrogator when reading out the identification number from the responder. The period 701 counts up the page number by the long clock pulse and the period 702 reads out a memory by the short-interval clock pulse.

Figure 7:
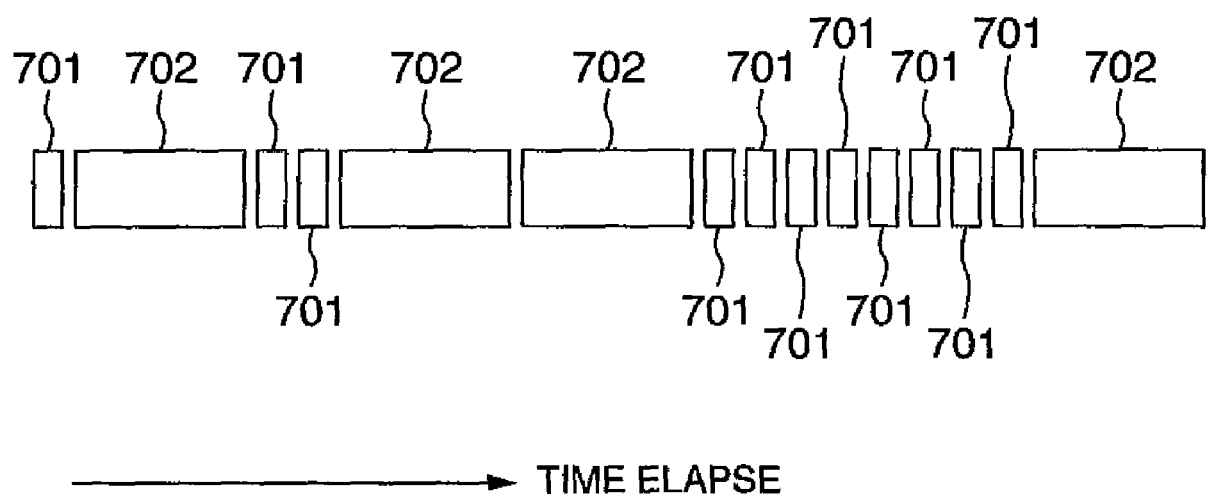
FIG. 7 is a diagram showing retry of reading according to the embodiment.

FIG. 7 shows a clock pulse transmitted from the interrogator when reading out the identification number from the responder. The pulse is identical to the pulse in FIG. 6 except for that there is a portion where the period 702 of memory read out by the short-interval clock pulse is repeated. The repetition of the memory read out period 702 corresponds to the steps: (1003)→(1008)→(1012)→(1007)→(1003) in the flow of FIG. 9.

In the first memory read out period 702 in the portion where the memory read out period 702 is repeated, the interrogator performs memory read out of the responder. After all the memories are read, the error check code which has read the data checks whether the data is normal or abnormal.

If abnormal, the interrogator continuously transmits the short-interval clock pulse and retries read before transmitting the next long-interval clock pulse. The binary counter indicating the memory address in the responder continues counting up repeatedly by the short-interval clock pulse, thereby repeatedly transmitting memory data.

On the other hand, when the noise source repeatedly transmits a short-interval clock pulse, the interrogator repeatedly transmits the short-interval clock pulse and tries to normally read data assuming that a responder exists. However, when no responder exists and only the noise source exists, only data as the noise source is read. When a plurality of responders operate, the responders repeatedly operate and data is detected redundantly by the interrogator and it is not considered as normal data.

Figure 3:
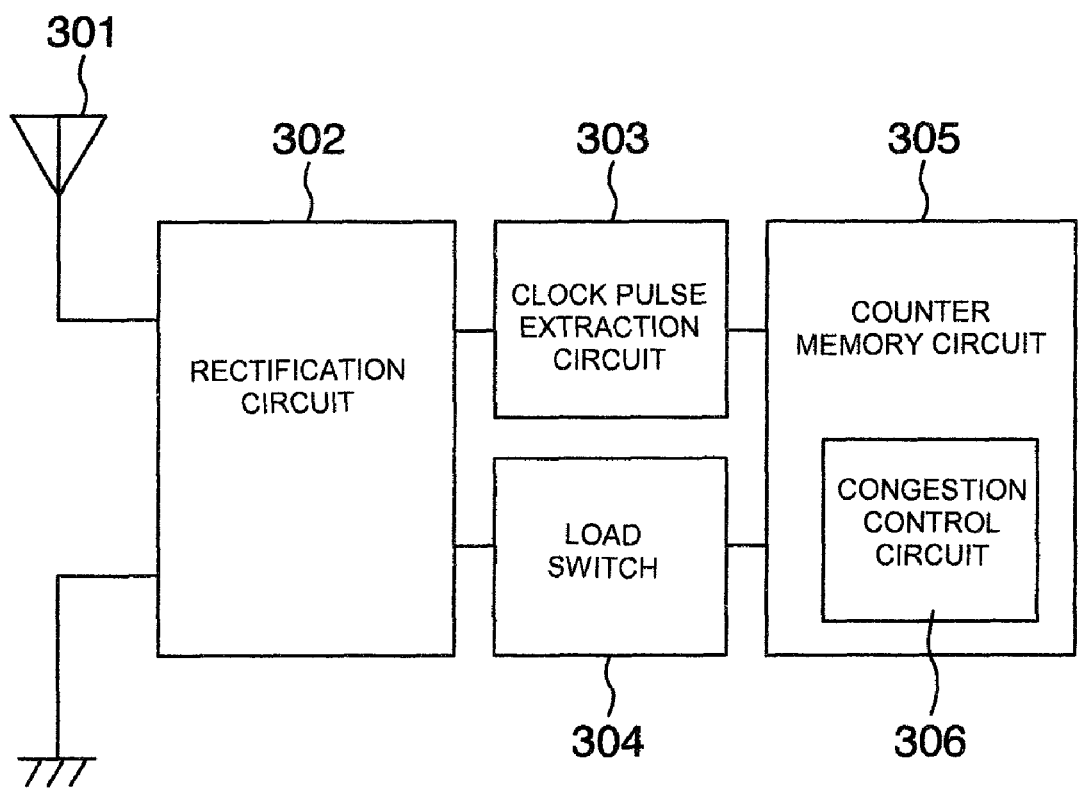
FIG. 3 is a diagram showing inside of the responder according to the embodiment.

FIG. 3 shows configuration of the responders 902 to 905 in FIG. 8. The responders 902 to 905 of the present invention can be manufactured by various techniques. In the embodiment given below, explanation will be given on a case of realization as a semiconductor chip as an example.

An antenna 301 receives a modulation signal from the interrogator and is connected to a rectification circuit 302. The rectification circuit 302 doubles/rectifies the voltage and supplies power voltage VDD. A clock pulse extraction circuit 303 demodulates a high-frequency modulation signal and extracts a low-frequency clock pulse, which is inputted to the counter memory circuit 305. The counter of the counter memory circuit selects each bit of the recognition number in the memory, changes the impedance between the antenna 301 by a load switch 304, and transmits the recognition number to the interrogator.

Figure 15:
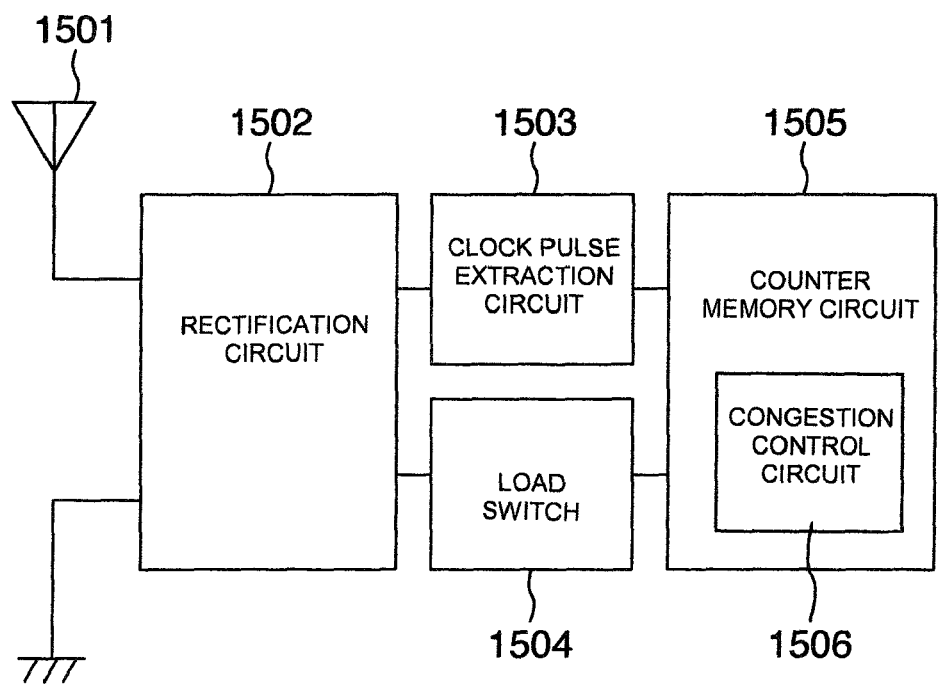
FIG. 15 is a diagram showing internal configuration of the interrogator.

FIG. 15 shows internal configuration of the interrogator in FIG. 8. An antenna 1501 of the interrogator receives a radio wave from the responder and is connected to a transmission/reception high-frequency circuit 1502. A modulation circuit 1503 performs modulation for the clock pulse waveform and a demodulation circuit 1504 detects and demodulates a signal from the responder. A base band processing circuit 1505 performs digital signal processing of transmission/reception. The base band processing circuit 1505 has a built-in congestion control circuit 1506 configured by a logical circuit for controlling the flow shown in FIG. 16.

Figure 2:
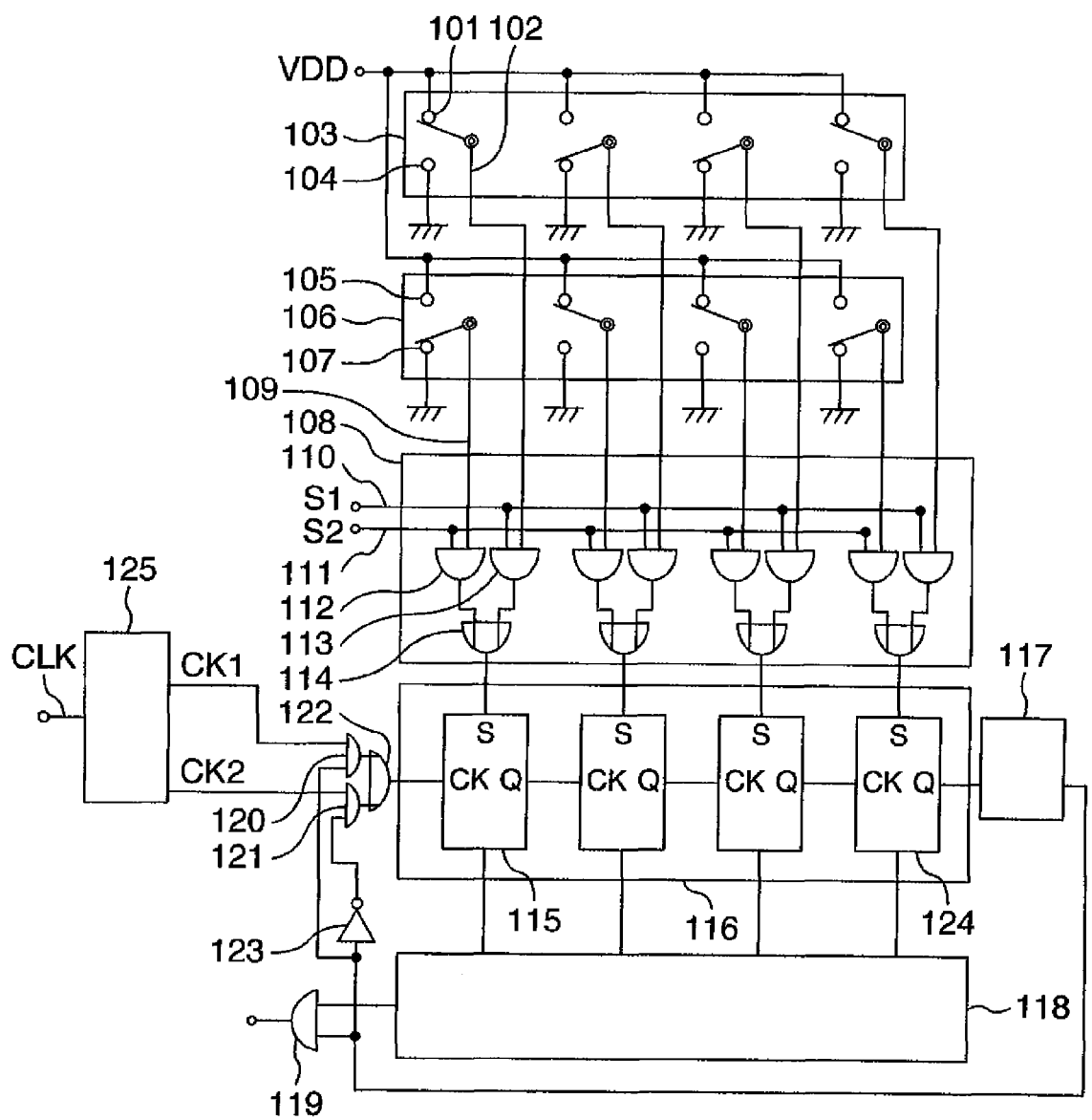
FIG. 2 is a diagram showing configuration of a counter memory circuit according to an embodiment.

FIG. 2 is a circuit diagram of the counter memory circuit 305 in FIG. 3. The counter memory circuit 305 performs count up of the page number, count up of the memory address for selecting each bit of the identification number, and selection of each bit of the identification number. The counter memory circuit 305 has a built-in congestion control circuit 306 configured by a logical circuit for controlling the flow shown in FIG. 9.

It is preferable that the counter for count up of the page number and the counter for count up of the memory address shares a single counter so as not to increase the chip size.

In this application, an embodiment is shown in which a counter is shared. However, when no consideration on the chip area is required, the counter need not be shared.

When sharing a counter, the bit count of the page number becomes the bit count of the memory address of the identification number. The memory address is generally 10 bits or so and the page number also becomes 10 bits or so, which increases the possibility of conflict with the page number of another responder. In this case, as has been described above, like step 1011 in FIG. 9, a plurality of page numbers are held in the responder and again set in the counter, thereby reducing the possibility of conflict. In this application, explanation will be given on a case when two types of page number are prepared.

The counter 116 counts up the clock pulse CK1 or CK2 selected by the output of the operation switching flip-flop.

The operation switching flip-flop has the function for switching between the page number count up operation and the memory address count up operation. When the output of the most significant flip-flop 124 in the counter 116 has changed from the L level to the H level, the output of the operation switching flip-flop changes from the L level to the H level. Here, the set state is when the output of the operation switching flip-flop is at the H and the reset state is when the output of the operation switching flip-flop is at the L.

When the output of the operation switching flip-flop 117 is at the H level, CK1 generated at a short clock pulse interval by an AND gate 120 and an OR gate 122 is inputted to the flip-flop 115 of the counter 116. The counter 116 counts up the memory address by the CK1. In the page number count up operation, an initial value of the page number is set in advance and count up is performed by a signal CK2 by the long-interval clock pulse.

When the output of the operation switching flip-flop 117 is at the L level, the signal is made H level by the inverter gate 123, the CK2 generated by the long clock pulse interval is inputted to the flip-flop 115 by the AND gate 120 and the OR gate 122, and the counter 116 counts up the page number by the CK2. In the memory address count up operation, the operation starts when the counter content is all zero, i.e., when the output of each flip-flop of the counter is at the L level and count up is performed by the signal CK1 of the short-interval clock pulse.

Figure 1:
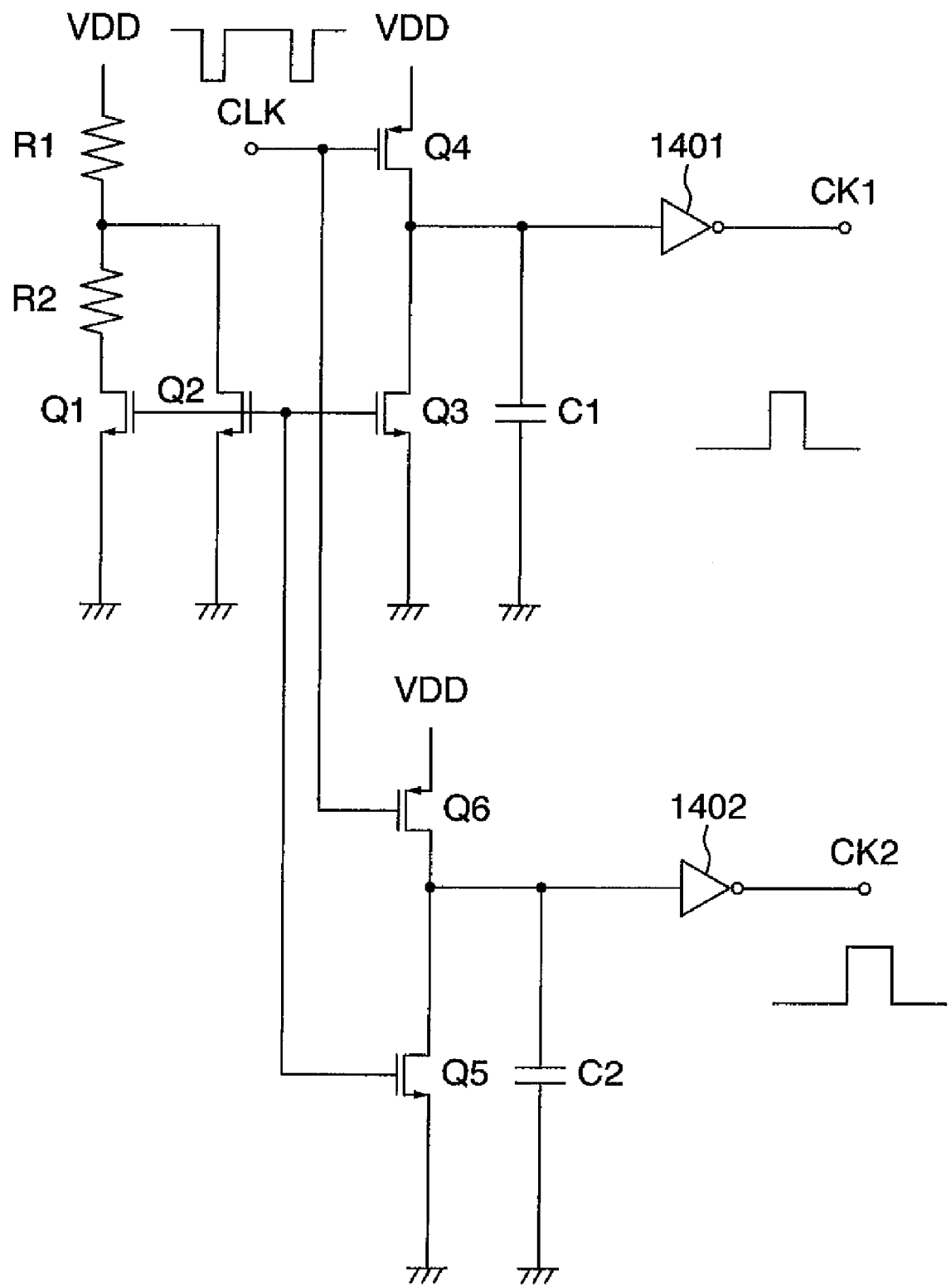
FIG. 1 is a diagram showing a clock pulse interval discrimination circuit.

A clock pulse interval discrimination circuit 125 discriminates CK1 of the short clock pulse interval and CK2 of the long clock pulse interval from the clock pulse (CLK) from the interrogator. FIG. 1 shows the detail of the clock pulse interval discrimination circuit, which will be explained later.

A plurality of connection terminals 102 are connected either to an electrically H terminal 101 or to an electrically L terminal 104, so that the page number first setting unit 103 holds each bit of the first page number. In the page number first setting unit 103, the connection terminal is set to HLLH from the left. This logically represents a number 1001 when the positive logic is assumed.

Similarly, a plurality of connection terminals 109 are connected either to an electrically H terminal 105 or to an electrically L terminal 107, so that the page number second setting unit 106 holds each bit of the first page number. In the page number second setting unit 106, the connection terminal is set to LHHL from the left. This logically represents a number 0110 when the positive logic is assumed.

Setting of the connection terminals 102, 109 is specifically set by the pattern obtained by the electronic line plotting. In the embodiment of FIG. 2, the counter has four bits but in this inventions the number may be greater than four.

The selector unit 108 selects the first page number or the second page number by the selection signals S1, S2 inputted to the first selection terminal 110 and the second selection terminal 111, respectively and inputs it to the counter. More specifically, the respective bits of the first page are inputted from the connection terminal 102 and the selection signal S1 is inputted from the first selection terminal 110 to the AND gate 112. Similarly, the respective bits of the second page are inputted from the connection terminal 109 and the selection signal S2 is inputted from the second selection terminal 111 to the AND gate 113. Outputs of the AND gates 111, 112 are inputted to the OR gate 114. The output of the OR gate is set as the initial value of the counter 116 in the plurality of flip-flops 115 constituting the counter 116.

The output of each flip-flop of the counter is inputted to a memory 118. The output of the memory is controlled by the AND gate 119 and the operation switching flip-flop.

Figure 5:
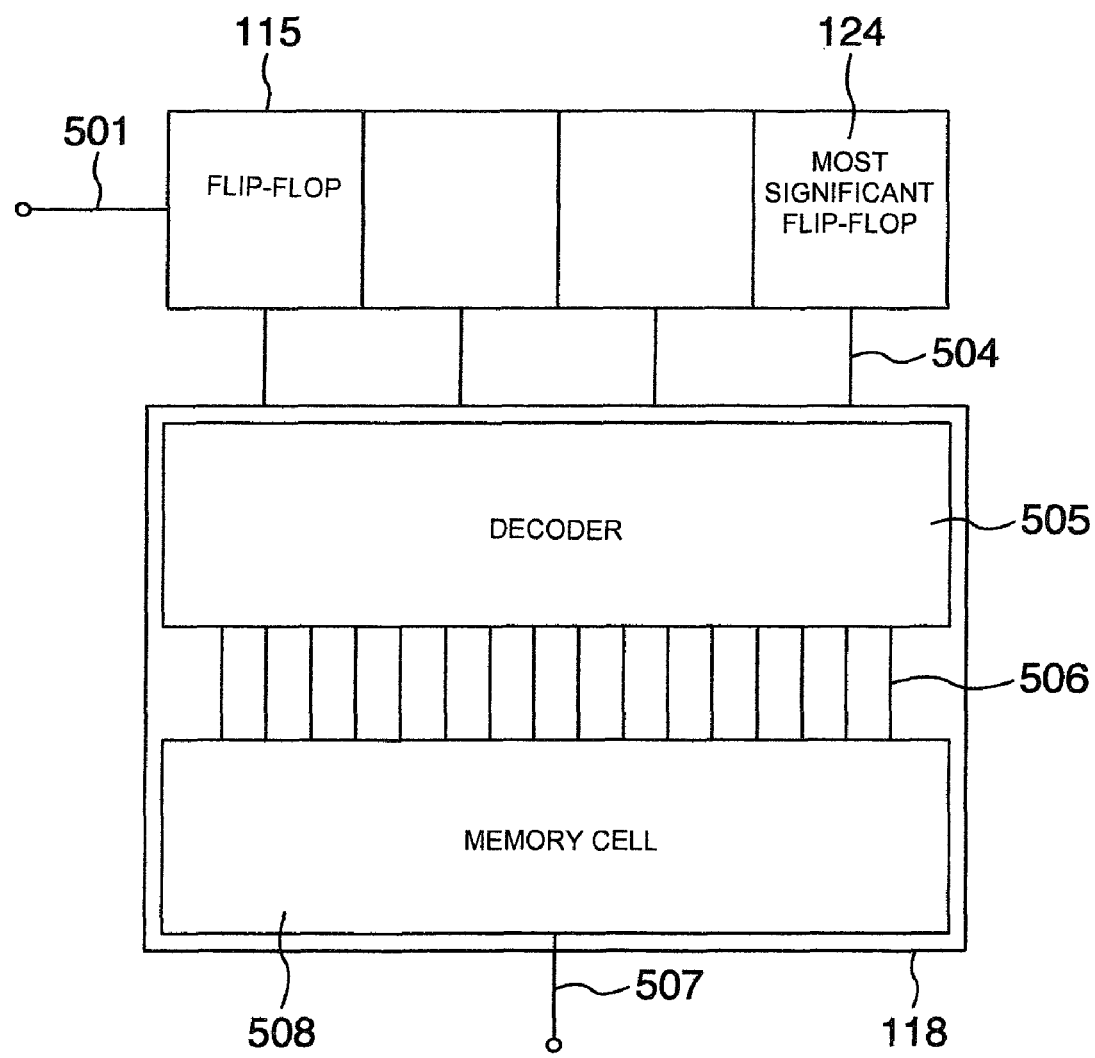
FIG. 5 is a diagram showing a counter and memory configuration according to the embodiment.

FIG. 5 shows configuration of the counter 116 and the memory 118 of the responder of FIG. 2. The memory 118 includes a decoder 505 and a memory cell 508. From each flip-flop constituting the counter 116 of FIG. 2, the memory address output 504 is inputted to the decoder 505.

A decoder output 506 (bit string representing X0 ... X15, Y0 ... Y7 in FIG. 13) is inputted from the decoder 505 to the memory cell 508. The memory cell outputs each bit of the identification number selected by the decoder output 506 as a memory output 507 to the AND gate 119.

That is, each bit of the identification number corresponding to the count value of the counter 116 during the memory address count up operation is read out. The relationship between the memory address and the decoder output should be in one-to-one correspondence so that all the bits of the identification number are read out.

The counter 502 of FIG. 2 is shared by the memory address and the page number count up and accordingly, the address output 504 becomes electrically H level and L level even when counting up the page number. However, the output from the memory 118 and the output of the switching flip-flop are inputted to the AND gate 119 and the AND gate 119 becomes electrically L level, so that the output from the memory 118 is ignored and the content of the memory is not read by the interrogator. That is, the responder appears as if it were at halt.

Moreover, in the embodiment of FIG. 2, the counter 502 is shared by the memory address and the page number count up. Accordingly, the number of bits of the memory address is identical to the number of bits of the page number.

Figure 13:
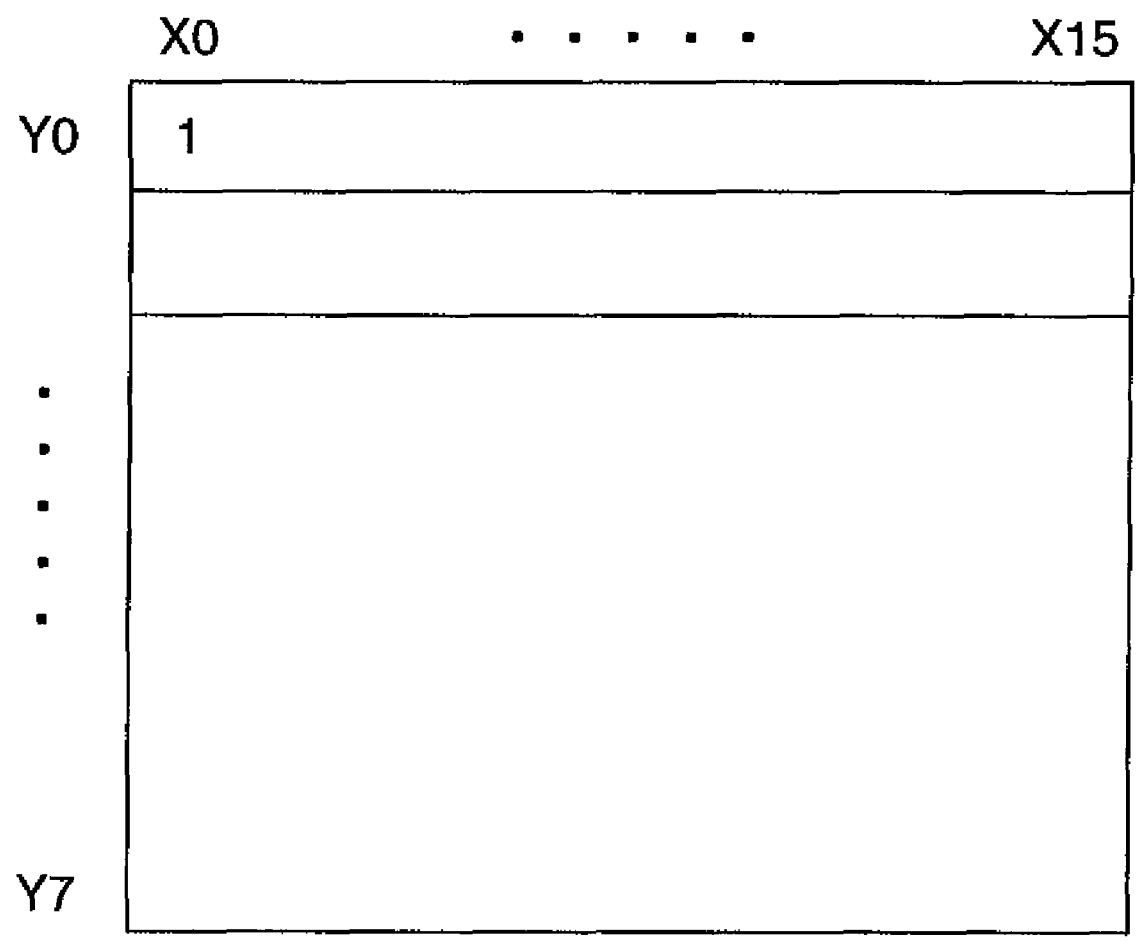
FIG. 13 is a diagram showing a memory state according to the embodiment.

FIG. 13 shows data configuration of the memory cell 508 of the present invention. This example shows a map format having 16 columns in the lateral direction and 8 rows in the longitudinal direction. In this example, it is assumed that data is successively transmitted to the interrogator in the order of X1 column, X2 column, starting at the X0 column of Y0 row.

Here, as has been described above, if the data of Y0 and X0 of the memory which is the starting bit of the identification number is 1, the interrogator immediately reads the head of the memory and can immediately confirm that the responder exists. More generally, it is preferable to prepare a bit indicating that data exists logically in the first half of at least ½ of the transmission data, so that the interrogator can rapidly confirm that a responder exists.

Figure 11:
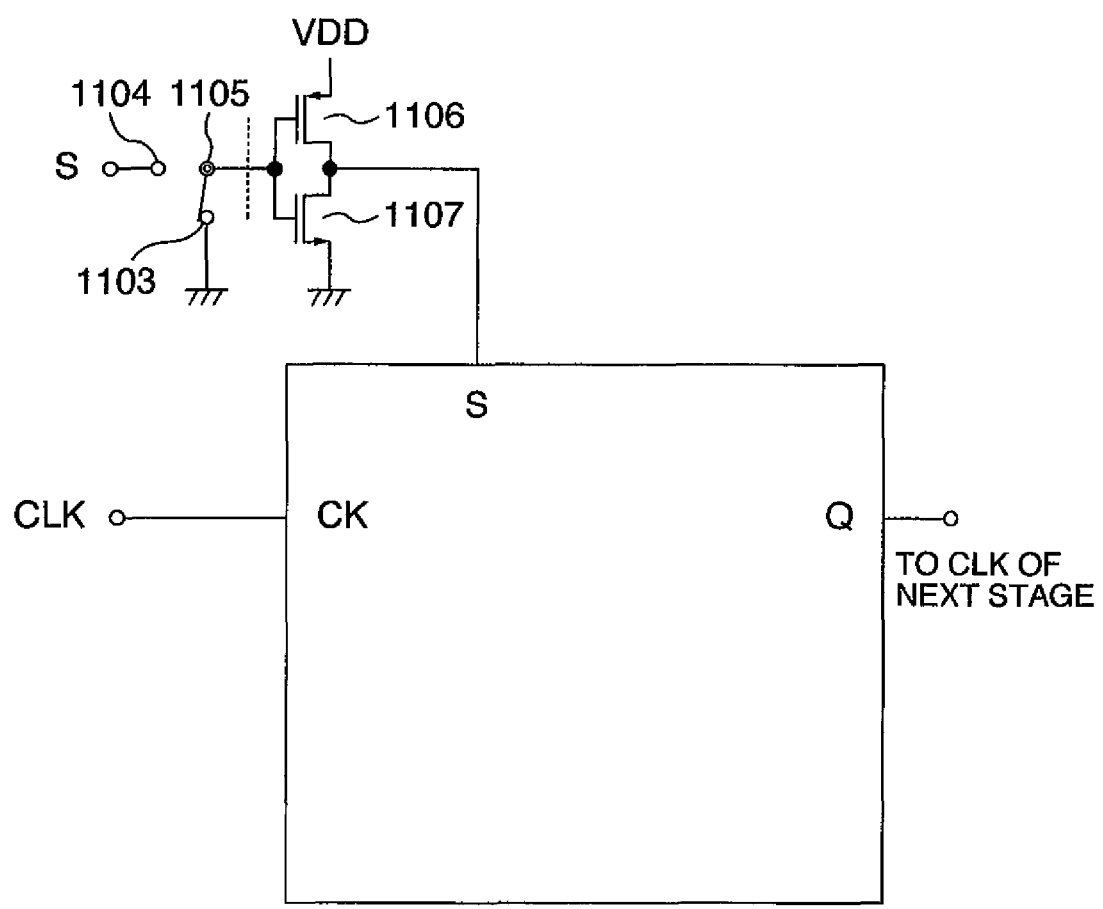
FIG. 11 is a diagram showing a flip-flop according to the embodiment.

FIG. 11 shows an example of a flip-flop for a counter used in this invention. The NOR gate 1101 is realized by a ground terminal 1103 and a selector terminal 1104 to which a signal from the AND gate 1102 and a set (S) signal are inputted and one of then is connected to the switching terminal. In this example, the ground terminal is connected to the switching terminal. By the PMOS transistor 1106 and the NMOS transistor, the switching terminal is inverted and inputted to the AND gate. Firstly, when the S signal becomes electrically L→H→L level, the output (OUT) of the flip-flop becomes electrically L level. Next, when the ground terminal is connected to the switching terminal like this example, the state is maintained until a clock pulse (CLK) comes, When the switching terminal is connected to the selector terminal and the selector terminal becomes L→H→L level, the output (OUT) of the flip-flop changes from L→H. That is, logically 1 is set.

Figure 12:
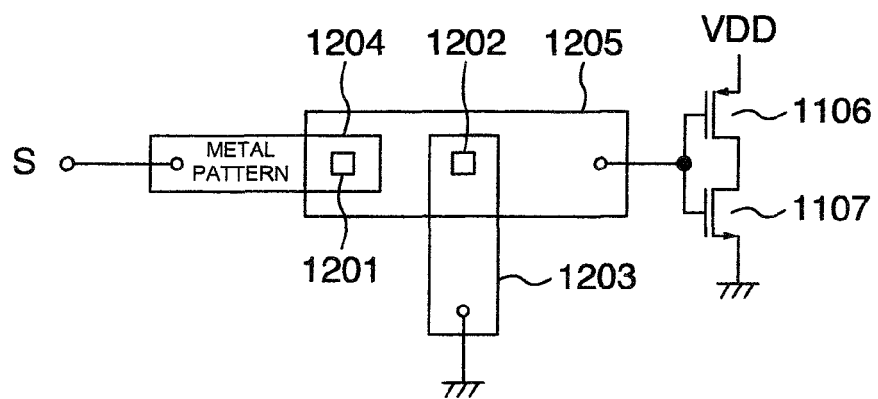
FIG. 12 is a diagram showing EB writing according to the embodiment.

FIG. 12 shows a layout pattern of a part of FIG. 11. The pattern 1203 shows a pattern for falling to the ground potential of 1103 in FIG. 11. 1204 shows a pattern for connection of 1104 in FIG. 11 to the selector terminal. 1205 of FIG. 12 has a pattern corresponding to 1105 in FIG. 11.

A first through hole 1201 is used for connection between a metal pattern 1204 of the upper layer indicating the selector terminal and a metal pattern 1205 of the lower layer indicating the connection terminal. A second through hole 1202 is used for connection between a metal pattern 1203 of the upper layer indicating the ground terminal and the metal pattern 1205 of the lower layer indicating the connection terminal. One of the first through hole 1201 and the second through bole 1202 is pattern-formed by a glass mask pattern or an electron ray direct plotting. Its number is directly written on each radio tag chip on the wafer by the electron ray direct plotting. The number may be a random number. The write is performed so that no identical numbers exist on the same wafer or numbers are distributed in the wafer and between wafers when the numbers are written. That is, the circuit shown in FIG. 11 can be realized as a compact one by only the wiring and the through holes. Normally, when setting a random number for a flip-flop, it is necessary to provide a circuit for generating random numbers and a complicated circuit for setting them. However, by using the pattern, it is possible to realize it with a small area.

Figure 14:
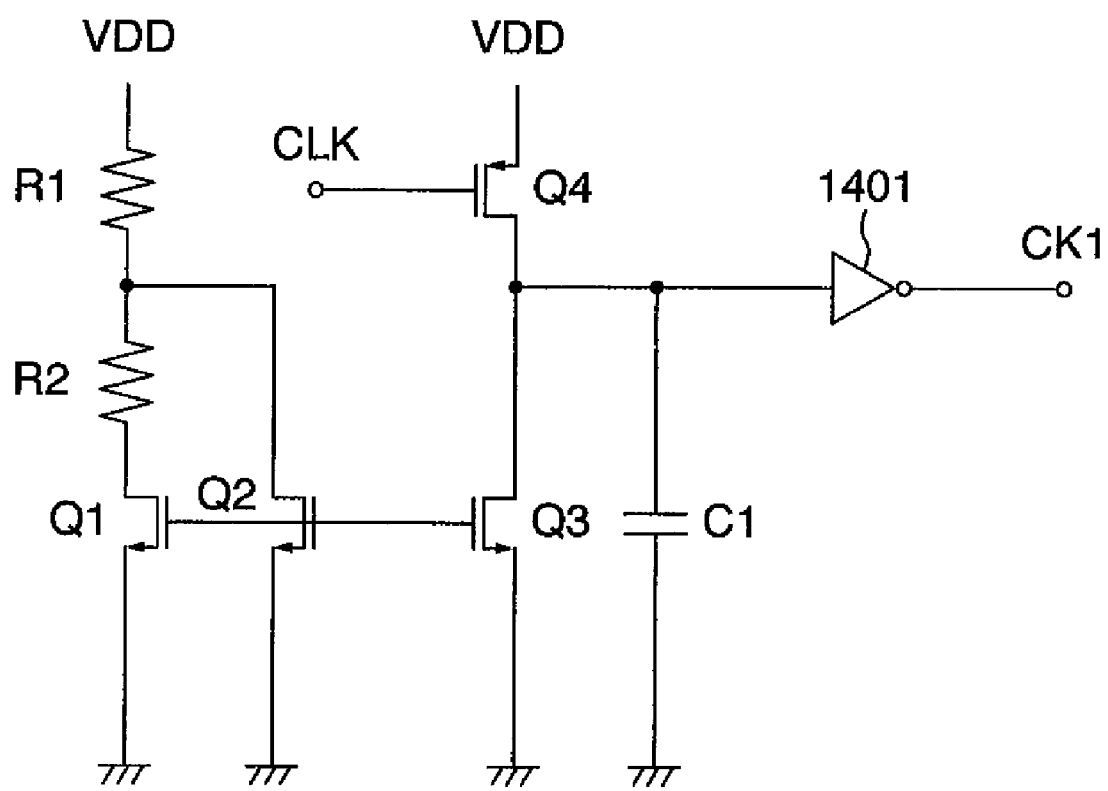
FIG. 14 is a diagram showing a clock pulse interval detection circuit according to the embodiment.

FIG. 14 shows a circuit for detecting an interval of the clock pulse. Output of the first inverter gate 1401 is a signal (CK1) indicating the detection result. In FIG. 14, a constant current can flow into a transistor Q3 by a resistor R1, a resistor R2, a transistor Q1, and a transistor Q2. When the responder has a carrier, energy can be supplied from the interrogator to the responder. Accordingly, the clock pulse signal (CLK) in the figure is set shorter when electrically L than when electrically H. This is a negative logic assuming that a clock pulse is present if the clock pulse is L level when CLK is at the H level. Accordingly, when CLK is at H level in FIG. 14, the transistor Q4 which is a PMOS transistor is OFF. Here, when a first clock pulse is inputted, CLK becomes L level and the transistor Q4 turns ON to charge up a capacitor C1. CK1 becomes H→L level. Next, the electric charge of C1 is extracted by the transistor Q3. When the clock pulse has a short interval, the transistor Q4 turns ON each time to charge up C1. On the contrary, when the clock pulse has a long interval, the voltage of C1 is lowered by extraction of electric charge from C1 and at last CK1 becomes L→H level. When the clock pulse is inputted, the CK1 returns to H→L level. That is, when the clock pulse interval is sufficiently long for extracting the electric charge from C1, the signal of CK1 outputs a signal L→H→L.

FIG. 1 shows the clock pulse interval discrimination circuit 116 of FIG. 2. FIG. 1 is a circuit based on the circuit of FIG. 14 with addition of transistors Q5, Q6, a capacitor C2, and an inverter 1402. The first inverter gate 1402 is an inverter output (CK2) having a part of the capacitor C2 as the input.

Only by adding some elements to FIG. 14 and changing C1, C2, and capacitance, it is possible to detect clock pulses (CK1, CK2) of different intervals. In this embodiment, C2 is set greater than capacitor C1. An example for realizing this is the transistor Q6, the transistor Q5, and the capacitor C2 in FIG. 14. When the capacitance value of the C2 or the gate length of the Q5 is made greater so that a clock pulse having a longer clock pulse than the CK1 signal of L→H→L level exists, the CK2 signal becomes L→H→L level.

Figure 4:
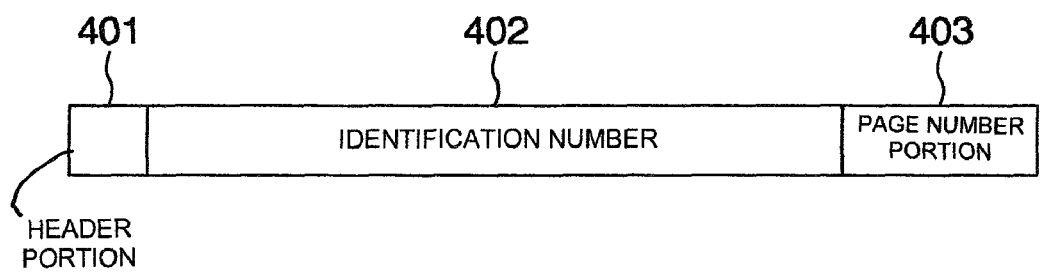
FIG. 4 is a diagram showing memory configuration of the responder according to the embodiment.

FIG. 4 shows a format of the memory in the radio IC tag chip of the present invention. A header portion 401 is at the head of the memory. An identification number 402 is at the center of the memory. A page number portion 403 is at the end of the memory. The header portion 401 is a display bit indicating the existence of the responder and has a function to report the existence of the responder to the interrogator as soon as possible. That is, prior to transmission of the identification number, it is preferable to prepare a bit indicating an electrically H level so as to confirm the existence of the responder to which the interrogator can transmit the identification number. Moreover, the header portion 401 may be a part of the identification number. The page number portion 403 may also serve as an entire error check code. In this case, when data on the radio IC tag is transmitted in the order controlled by the page number in the congestion control, if the reader is normal, it is confirmed that no error is present by the page number and simultaneously with this, it is promptly confirmed that data is transmitted in the order of the page number.

As has been described above, the present invention simplifies the congestion control method using the responder and the interrogator and increases the number of chips (RFID tags) having the congestion control function which can be cut out from a wafer, thereby improving the mass production and reducing the manufacturing cost per unit.

Furthermore, it is possible to arrange a plurality of RFID in the effective radio wave area of the interrogator and increase the interrogator effective radio wave area greater than the size of the object on which the RFID is mounted and the range of the arrangement interval.

The present invention invented by the inventor has been explained specifically according to the embodiment. However, the present invention is not to be limited to the aforementioned embodiment but can be modified in various ways without departing from the spirit of the invention. For example, two types of clock pulse are sufficient and the long clock pulse and the short clock pulse may have opposite functions. Moreover, what is stored by the responder may be various data instead of the identification number.

INDUSTRIAL APPLICABILITY

The present invention can be applied to the RFID as a technical field of the background of the present invention. Moreover, the present invention is not limited to this but can be applied to, for example, congestion control in a general radio LAN and a mobile telephone.

The invention claimed is:

1. A responder comprising:
a memory cell holds an identification number;
a first counter with a first initial value;
a second counter with a second initial value different from the first initial value; and
an operation switching flip-flop;
wherein the second counter starts to count up a plurality of second clock pulses from the second initial value and the memory cell reads out each bit of the identification number according to a count value of the second counter after the first counter counts up a plurality of first clock pulses from the first initial value to a predetermined value, intervals of the plurality of first clock pulses and the plurality of second clock pulses being different from each other.

2. The responder according to claim 1, further comprising:
a decoder;
wherein the decoder decodes count values of the second counter and outputs decoder outputs to the memory cell, and
the memory cell outputs each bit of the identification number selected by the decoder outputs.

3. The responder according to claim 1, further comprising:
a selector unit;
a first page number setting unit which holds a first page number; and
a second page number setting unit which holds a second page number;
wherein the selector unit sets either one of the first page number and the second page number to the first counter as the initial number.

4. The responder according to claim 1,
wherein the intervals of the first clock pulses are longer than the intervals of the second clock pulses.

5. The responder according to claim 1,
wherein the responder receives the plurality of first clock pulses and the plurality of second clock pulses modulated by ASK modulation.

6. A responder comprising:
a memory cell holds an identification number;
a counter; and
an operation switching flip-flop;
wherein a plurality of first clock pulses are inputted into the counter when the operation switching flip-flop is in a set state,
a plurality of second clock pulses are inputted into the counter when the operation switching flip-flop is in a reset state,
the counter counts up the plurality of first clock pulses from a first initial value until a count value of the counter become zero,
after the count value of the counter become zero, the counter outputs a carry and the carry sets the operation switching flip-flop into the reset state, and
after the counter is set into the reset state, the counter starts to count up the plurality of second clock pulses from a second initial value different from the first initial value and the memory cell reads out each bit of the identification number according to a count value of the counter, intervals of the plurality of first clock pulses and the plurality of second clock pulses being different from each other.

7. The responder according to claim 6,
wherein the operation switching flip-flop outputs a first signal at a first level when the operation switching flip-flop is set in the set state; and
the operation switching flip-flop outputs a second signal at a second level when the operation switching flip-flop is in the reset state.

8. The responder according to claim 6, further comprising:
a decoder;
wherein the decoder decodes count values of the counter and outputs decoder outputs to the memory cell; and
the memory cell outputs each bit of the identification number selected by the decoder outputs.

9. The responder according to claim 6, further comprising:
a selector unit;
a first page number setting unit which holds a first page number; and
a second page number setting unit which holds a second page number,
wherein the first selector unit sets either one of the first page number and the second page number to the first counter as the initial number.

10. The responder according to claim 6,
wherein the intervals of the plurality of first clock pulses are longer than the intervals of the plurality of second clock pulses.

11. The responder according to claim 6,
wherein the responder receives the plurality of first clock pulses and the plurality of second clock pulses modulated by ASK modulation.

12. A responder comprising:
a memory cell for holding an identification number having been assigned to the responder;
a pair of first and second counters, each of which has an initial value different from each other, for counting up the initial value to a predetermined value in response to either one of a first clock pulse or a second clock pulse sent from an interrogator connected to the responder;
wherein the first counter starts to count up a plurality of the first clock pulses, so that data including the identification number is transmitted from the responder to the interrogator according to a count value of the first counter with the predetermined value after the first counter counts up a plurality of first clock pulses from an initial value to another predetermined value, an interval of the first clock pulse being longer than an interval of the second clock pulse.

13. The responder according to claim 12, further comprising an operation switching flip-flop, wherein the data including the identification number is arranged to be transmitted when the operation switching flip-flop is set.

14. The responder according to claim 12, wherein the initial values for either one of the first or the second counters can be set in a plurality of times.

15. A responder comprising:
a memory cell for holding an identification number having been assigned to the responder:
a pair of first and second counters, each of which has an initial value arranged to be set in a plurality of times different from each other, for counting up the initial value to a predetermined value in response to either one of a first clock pulse or a second clock pulse sent from an interrogator connected to the responder; and
an operation switching flip-flop for outputting a setting signal, in response to a value of either one of the first or the second counters, by which the data including the identification number is transmitted;
wherein the first counter starts to count up the first clock pulse, so that the data is transmitted from the responder to the interrogator according to a count value of the first counter with the predetermined value after the first counter counts up a plurality of first clock pulses from an initial value to another predetermined value, an interval of the first clock pulse being longer than an interval of the second clock pulse.

16. An RFID system comprising an interrogator for outputting either one of first clock pulse or second clock pulse, an interval of the first clock pulse being longer than an interval of the second clock pulse; and a plurality of responders, wherein the plurality of responders each include:

a memory cell for holding an identification number having been assigned to the responder;

a pair of first and second counters, each of which has an initial value arranged to be set in a plurality of times different from each other, for counting up the initial value to a predetermined value in response to either one of a first clock pulse or a second clock pulse sent from an interrogator connected to the responder; and an operation switching flip-flop for outputting a setting signal, in response to a value of either one of the first or the second counters, by which the data including the identification number is transmitted;

wherein the first counter starts to count up the first clock pulse, so that the data is transmitted from the responder to the interrogator according to a count value of the first counter with the predetermined value after the first counter counts up a plurality of first clock pulses from an initial value to another predetermined value, the interval of the first clock pulse being longer than the interval of the second clock pulse.

* * * * *